US009728007B2

(12) United States Patent
Hakkarainen et al.

(10) Patent No.: US 9,728,007 B2
(45) Date of Patent: Aug. 8, 2017

(54) MOBILE DEVICE, SERVER ARRANGEMENT AND METHOD FOR AUGMENTED REALITY APPLICATIONS

(75) Inventors: Mika Hakkarainen, Espoo (FI); Tuomas Kantonen, Espoo (FI)

(73) Assignee: TEKNOLOGIAN TUTKIMUSKESKUS VTT OY, Espoo (FI)

( * ) Notice: Subject to any disclaimer, the term of this patent is extended or adjusted under 35 U.S.C. 154(b) by 843 days.

(21) Appl. No.: 13/698,668

(22) PCT Filed: May 18, 2010

(86) PCT No.: PCT/FI2010/050399
§ 371 (c)(1),
(2), (4) Date: Dec. 10, 2012

(87) PCT Pub. No.: WO2011/144793
PCT Pub. Date: Nov. 24, 2011

(65) Prior Publication Data
US 2013/0088577 A1 Apr. 11, 2013

(51) Int. Cl.
*H04N 13/00* (2006.01)
*H04N 13/02* (2006.01)
(Continued)

(52) U.S. Cl.
CPC ....... *G06T 19/006* (2013.01); *H04N 5/23293* (2013.01); *G01S 19/42* (2013.01)

(58) Field of Classification Search
USPC .............................................. 348/42, 47–54
See application file for complete search history.

(56) References Cited

U.S. PATENT DOCUMENTS 6,445,815 B1 9/2002 Sato
8,218,943 B2 * 7/2012 Iwane ............... G06F 17/30817
348/218.1
(Continued)

OTHER PUBLICATIONS

Wouter, P et al., Augmented reality with large 3D models on a PDA—Implementation, performance and use experiences. Proc of ACM Siggraph International Conference on Virtual reality Continuum and its Applications in Industry (VRDAI), pp. 344-351, 2004.
(Continued)

*Primary Examiner* — Nigar Chowdhury
(74) *Attorney, Agent, or Firm* — Mark M. Friedman

(57) ABSTRACT

A mobile device (104, 204) comprising communications interface (324) for transferring data, a digital camera (328) for obtaining a camera view (102) of the surroundings of the mobile device at a location, a display (330) for visualizing data such as the camera view (102), and an augmented reality (AR) entity (332) configured to transmit, via the communications interface, an indication of the location of the mobile device to an external entity, obtain, by applying data transfer from said external entity via the communications interface, a representation determined on the basis of a number of 3D models (202) of one or more virtual elements (102e, 206a) deemed as visually observable from the location of the mobile device, said representation forming at least a part of at least an approximation of spherical projection (108, 208, 210) of said 3D models, wherein the associated spherical surface is configured to surround the location of the mobile device, and produce an AR view (102d) for visualization on the display on the basis of the camera view and orientation-wise matching portion, such as 2D images and/or parts thereof, of the representation. Related server arrangement and methods are presented.

15 Claims, 3 Drawing Sheets

(51) Int. Cl.
*G06T 19/00* (2011.01)
*H04N 5/232* (2006.01)
*G01S 19/42* (2010.01)

(56) References Cited

U.S. PATENT DOCUMENTS

| | | | |
|---|---|---|---|
| 8,267,927 B2* | 9/2012 | Dalal | A61B 18/1477 606/34 |
| 2002/0073563 A1* | 6/2002 | Toda | G01C 9/10 33/366.24 |
| 2005/0289590 A1 | 12/2005 | Cheok | |
| 2006/0257032 A1* | 11/2006 | Nakagawa | G06T 17/20 382/232 |
| 2008/0071559 A1 | 3/2008 | Arrasvuori | |
| 2009/0237328 A1* | 9/2009 | Gyorfi | G06F 3/011 345/9 |
| 2010/0257252 A1* | 10/2010 | Dougherty | G06K 9/00979 709/217 |
| 2011/0006977 A1* | 1/2011 | Khosravy | G06F 3/017 345/156 |
| 2011/0221656 A1* | 9/2011 | Haddick | G02B 27/017 345/8 |

OTHER PUBLICATIONS

Shum, H-Y et al., review of Image Based Rendering techniques, SPIE: Proc. of Visual Communication and Image Processing (VCIP'2000), vol. 4067, pp. 2-13, Jun. 2000.

* cited by examiner

MOBILE DEVICE, SERVER ARRANGEMENT AND METHOD FOR AUGMENTED REALITY APPLICATIONS

FIELD OF THE INVENTION

Generally the present invention pertains to computer and telecommunications systems. In particular, the present invention concerns augmented reality solutions and related methods.

BACKGROUND

Augmented reality (AR) refers to techniques integrating virtual elements into real-world environment such as a real-world view inspected via a computer display, for example. Augmented reality applications include both entertainment and professional ones. Games represent the more entertaining use cases whereas different navigation, such as vehicle/vessel navigation or pedestrian navigation, and status display applications superimposed on e.g. real-time images belong to the more serious domain of AR. Accordingly, many of the AR's most prominent use cases incorporate also various aspects of location-based services (LBS) exploiting e.g. GPS (Global Positioning System) and/or Near LBS technologies such as WLAN (Wireless LAN, Local Area Network) or Bluetooth for positioning. For instance, a mobile electronic device may be configured to identify the location thereof on the basis of an available LBS solution, e.g. an integrated GPS receiver, whereupon a camera view visualized on the display of the device is augmented with navigational, commercial, weather or other type of location-dependent information.

Notwithstanding the obvious benefits of already-existing AR solutions, some problems still exist therewith, particularly in connection with mobile solutions. Mobile devices such as smartphones or PDAs (Personal Digital Assistant) typically have rather modest processing and memory capabilities in addition to limited battery capacity in contrast to desktop or even laptop computers, for instance. As a result, modeling and visualization of potentially complex 3D entities in connection with AR applications cannot be done at all, or at least various simplification procedures have to be performed to a level that noticeably degrades the perceived quality of the visualized result. However, the utilization of bulkier and heavier, but admittedly generally more powerful, laptop or desktop computers is in many applications impossible or at least extremely impractical considering e.g. different, basically location-independent, outdoor, travelling or navigation scenarios mentioned hereinbefore.

SUMMARY OF THE INVENTION

The objective is to at least alleviate the problem described hereinabove and to provide an AR solution feasible for use with mobile devices without sacrificing the quality of the achievable rendering result to an annoying extent.

The objective is achieved by different embodiments of a mobile device, a server arrangement, a system, and a method in accordance with the present invention. An aspect of the devised solution thus incorporates utilization of a mobile, optionally personal, device comprising or being at least functionally connected to a display element configured to visualize an AR scene comprising both real word and artificial, augmented virtual elements. The virtual elements may be visualized via a representation comprising e.g. 2D images determined on the basis of 3D models of the elements such that at a real world location of the mobile device, i.e. at the view point, at least an approximation of a spherical projection of virtual elements around the mobile device (and user thereof) is provided. A server entity may be utilized for storing model data and/or determining representations, for example.

The mobile device may include at least one element selected from the group consisting of: a mobile terminal, a PDA (personal digital assistant), a wrist computer (wristop), a hand-held, a tablet PC, an UMPC (Ultra-Mobile PC) device, a palmtop, a portable multimedia/music player, a calculator, a digital camera, a digital video camera, and a dictaphone.

Accordingly, in one aspect of the present invention a mobile device comprises a communications interface for transferring data, a digital camera for obtaining a camera view of the surroundings of the mobile device at a location, a display for visualizing data such as the camera view, and an augmented reality (AR) entity configured to transmit, via the communications interface, an indication of the location of the mobile device to an external entity, obtain, by applying data transfer from said external entity via the communications interface, a representation, optionally comprising a number of 2D images, determined on the basis of a number of 3D models of one or more virtual elements deemed, in the AR application at issue, as visually observable from the location of the mobile device, said representation preferably forming at least a part of at least an approximation of spherical projection of said 3D models, said projection surface (approximation) being calculated relative to and surrounding the location of the mobile device, and produce an AR view for visualization on the display on the basis of the camera view, wherein the camera view may optionally be e.g. a real-time view, stored video view or a still image view, and orientation-wise matching portion, such as 2D images and/or parts thereof, of the representation.

In one embodiment, the representation may comprise a number of, e.g. a plurality of, 2D images. The 2D images may be used to construct the spherical projection (approximation). The representation may further comprise metadata describing the mutual configuration, such as placement and position/orientation, of the 2D images and/or other factor(s) affecting the reconstruction of the spherical projection (approximation). Such metadata may be provided as integrated with the images, as stand-alone information, or aggregated with some other data.

Indeed, the representation may comprise a plurality of 2D images establishing the at least part of an approximation of the spherical projection. The approximation may include or be at least based on a polyhedron, preferably a regular polyhedron such as an icosahedron with 20 triangular faces. Each face of the polyhedron may be associated with at least one image. Accordingly, a total of at least 20 images may be applied to create a complete spherical projection, for instance.

Alternatively, e.g. a single image may be utilized and realized, for example, as a texture to be formed on a spherical surface, i.e. the sphere is mapped with the texture.

In another, either supplementary or alternative, embodiment the mobile device may contain or be at least connected to a positioning device such as a GPS or other satellite/wireless receiver for determining the location of the mobile device and thus potentially the user thereof. Alternatively or additionally, the mobile device may apply network-based positioning such as cellular network-based and/or assisted positioning, Bluetooth positioning or WLAN positioning, or some other feasible positioning arrangement. Location information may be obtained periodically or upon a detected occurrence of a predetermined trigger, such as a detection of movement and/or orientation change, for instance. As a further alternative, location information may be obtained via user input. Keypad, touch screen or other input element of the mobile device may be applied for providing such information.

Location information may be analyzed and one or more related and/or derived parameters such as velocity, speed, acceleration, travelled distance, and/or travelled course may be estimated on the basis thereof. Such information and/or parameters may be transferred between the mobile device and the server in desired direction, for example. Further, different estimates of future movement and associated locations may be predicted on the basis of historical data. These future estimates may be utilized for pre-determining, e.g. by the server, future location based representation(s) before the actual need thereof. E.g. different extrapolation techniques applying the previous locations and optionally further parameters such as velocity or speed may be applied for the purpose. A pre-determined representation may be optionally transferred to the mobile device at a desired instant, e.g. prior to the actual need, i.e. for potential future use, or upon the actual need.

In a further, either supplementary or alternative, embodiment the mobile device comprises a position sensor such as at least one inclinometer, accelerometer and/or gyroscope. It may be used for determining the orientation of the camera, for example. Additionally or alternatively, the mobile device may estimate the orientation on the basis of camera view image(s) and related optical flow analysis and/or motion estimation/feature tracking, for example. A number of pre-determined optical flow determination methods may be used for the purpose. The applied method may be differential such as Lucas-Kanade, block-based and/or phase correlation-based among other options.

The mobile device may support direct context awareness, i.e. it may be self-contained what comes to different aforementioned positioning and/or sensing entities. Alternatively or additionally, the mobile device may support indirect context awareness, i.e. it receives position/sensor data from external, functionally connected entities such as external positioning/sensing devices at least functionally coupled to the mobile device.

In another aspect of the present invention, a server arrangement comprises
  a data interface for communicating with external entities such as a network infrastructure and a mobile device connected thereto,
  a model repository for maintaining a number of 3D models of one or more virtual elements and their predetermined locations relative to real world locations, and
  a constructor entity configured to determine, on the basis of an indication of a location of a mobile device obtained via the data interface and on the basis of a number of 3D models of one or more virtual elements deemed as visually observable from said location of the mobile device, a representation forming at least a part of at least an approximation of a spherical projection of the observable 3D models, said spherical surface surrounding the location of the mobile device, and to
  transmit the representation via the data interface to the mobile device to facilitate producing an AR view on the display of the mobile device.

In a further aspect of the present invention, a system comprising an embodiment of the mobile device and an embodiment of the server arrangement is provided.

Still in a further aspect, a method for creating augmented reality (AR) view comprises:
  providing an indication of the location of a mobile device,
  obtaining a representation, optionally comprising a number of 2D images, determined on the basis of a number of 3D models of virtual elements deemed as visually observable, in an AR application, from the location of the mobile device, said representation forming at least a part of at least an approximation of spherical projection of said 3D models, the associated spherical surface surrounding the location of the mobile device,
  obtaining a digital camera view by the mobile device at said location, and
  producing an AR view for visualization on a display on the basis of the camera view and orientation-wise matching portion of the representation.

The method may be performed by a mobile device, for example.

Yet in a further aspect, a method for providing data for augmented reality (AR) application, comprises
  obtaining an indication of the location of a mobile device,
  constructing a representation, optionally comprising a number of 2D images, determined on the basis of a number of 3D models of virtual elements deemed as visually observable, in an AR application, from the location of the mobile device, said representation forming at least a part of at least an approximation of spherical projection of said 3D models, the associated spherical surface surrounding the location of the mobile device, and
  transmitting the representation to the mobile device to facilitate it producing an AR view.

The method may be performed by a server arrangement, for example.

In a further aspect, a method for augmenting reality, comprises
  obtaining an indication of the location of a mobile device,
  constructing a representation, optionally comprising a number of 2D images, determined on the basis of a number of 3D models of one or more virtual elements deemed as visually observable, in an AR application, from the location of the mobile device, said representation forming at least a part of at least an approximation of spherical projection of said 3D models, the associated spherical surface surrounding the location of the mobile device,
  obtaining a digital camera view by the mobile device at said location, and
  producing an AR view for visualization on a display on the basis of the camera view and orientation-wise matching portion of the representation.

The method may be performed by one or a plurality of entities, such as a mobile device and/or a server. The server may receive the indication and/or the camera view from the mobile device.

The previously presented considerations concerning the various embodiments of the mobile device may be flexibly applied to the embodiments of the server arrangement, the system and each method mutatis mutandis and vice versa, as being appreciated by a skilled person.

The utility of the present invention follows from a plurality of issues depending on each particular embodiment. The suggested solution enables visualizing the potentially complex 3D models of virtual elements, such as models of one or more virtual objects such as buildings, plants, signs and other items, or a model of whole environment, which are each associated with a certain real world location, using a spherical projection-based representation, the visualization of which is computationally and memory-wise lighter to execute than many other alternatives. Unnecessary processing and data transfer may be minimized as the representation may be constructed only upon location change of the mobile device utilizing the AR application in question. Pre-calculated representations may also be generated for future use. Even the ordinary mobile devices such as average level contemporary camera phones may incorporate the necessary processing power for superimposing an applicable portion of the representation on a camera's screen display to produce the AR view, for example. As the representation associated with a current location of the mobile device (user) may be provided to the mobile device in one go, the user may pan the camera view freely while staying at the same location without a need to construct a new representation at the server and deliver it forward to the mobile device waiting for new data to arrive.

The solution building blocks, such as construction and/or local (mobile) utilization of the representation, may be made scalable to recognize different terminals' capabilities and e.g. available connection bandwidth and/or other factors so that the performance of each terminal may be utilized to a desired, if not maximum, extent. The present invention is suitable for both indoors and outdoors use depending on the applied AR scenario and e.g. available positioning equipment.

The expression "a number of" refers herein to any positive integer starting from one (1), e.g. to one, two, or three.

The expression "a plurality of" refers herein to any positive integer starting from two (2), e.g. to two, three, or four.

Different embodiments of the present invention are disclosed in the dependent claims.

BRIEF DESCRIPTION OF THE RELATED DRAWINGS

Next the invention is described in more detail with reference to the appended drawings in which FIG. 1 illustrates the overall concept of an embodiment of the present invention.

DETAILED DESCRIPTION OF THE EMBODIMENTS

Figure 1:
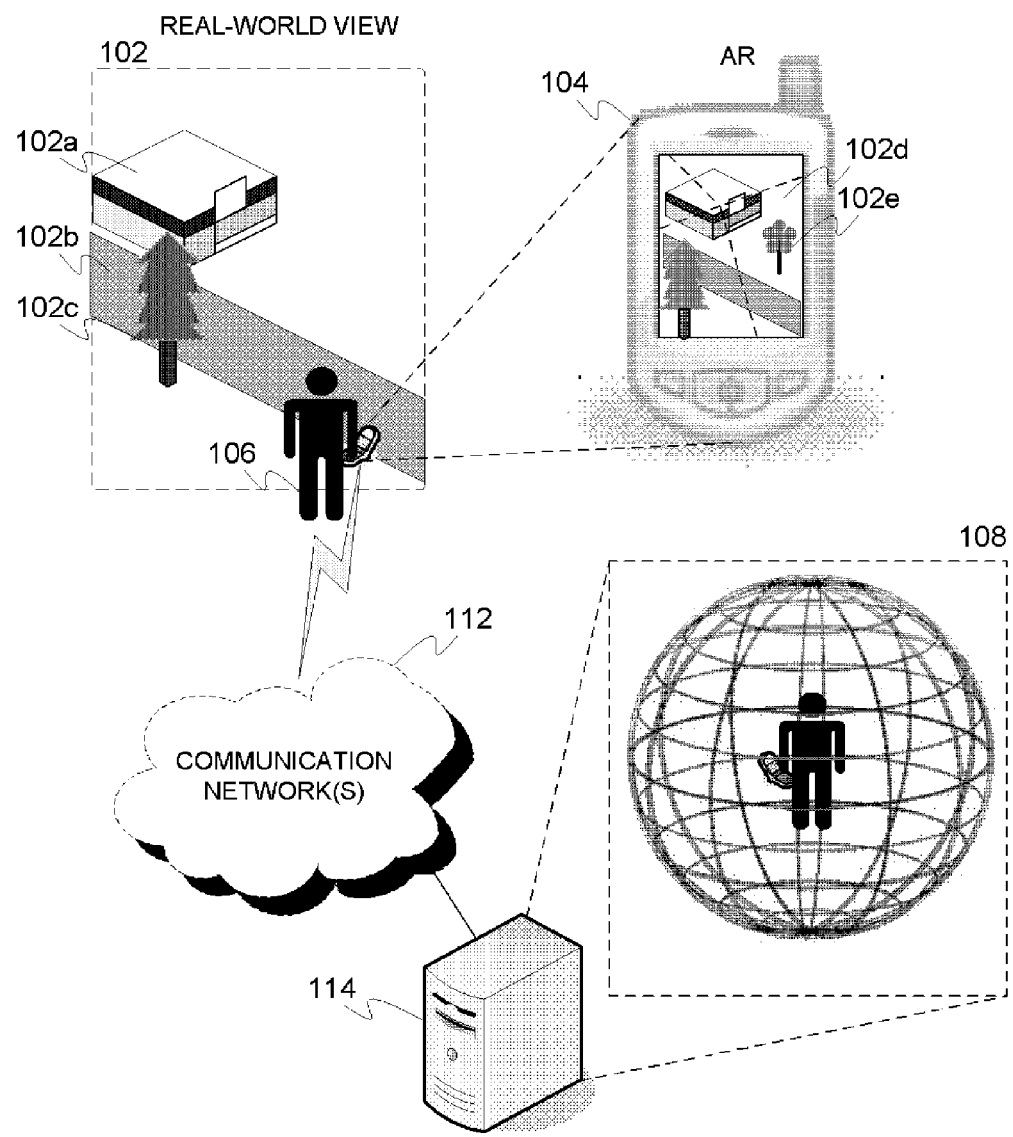

FIG. 1 illustrates the overall concept of the present invention according to an embodiment thereof. A mobile device 104, such as a mobile phone (e.g. a smartphone), UMPC or a PDA (personal digital assistant), is provided with an imaging apparatus such as a digital (video) camera that is functionally coupled to a view-finder and/or a display of the mobile device 104 for displaying the camera view preferably in substantially real-time fashion. A number of virtual 3D models may have been associated with the real world location(s). For example, different imaginary buildings, structures or parts thereof may have been modeled and associated with physical locations via an applicable reference system such as a coordinate system. The user 106 of the mobile device 104 is located outdoors and the surrounding scenery of a camera view 102 includes e.g. a building 102a, a road 102b and a tree 102c. The user 106 is aiming the camera at the aforesaid elements, whereupon they appear at the camera view shown on the display of the device 104. Additionally, the camera view image is augmented 102d with an image of a flower 102e the model of which has been originally associated with a location shown in the camera view.

Preferably the mobile device 104 has indicated the location thereof to a server 114, optionally via intermediate communications network(s) 112, and in return, the server 114 has calculated, or provided a pre-calculated, spherical projection 108 of the virtual environment comprising the flower 102e using the location of the mobile device (view point) as a reference point such that the projection surrounds it. The spherical projection may have been determined and/or adapted into a simplified representation such as a icosahedron, wherein each face of the icosahedron is modeled with a 2D image, for example. The representation may thus comprise a number of portions. The representation has been provided to the mobile device 104 so that the mobile device 104 may augment the current camera view 102 with a corresponding part of the representation. For example, generated 2D images or parts thereof belonging to the spherical surface through which the camera view is conceptually taken may be visualized on the corresponding locations, i.e. matching portions, of the camera view. The broken lines shown on top of the augmented camera view 102d are merely used in the figure to illustrate the potential image or other portion borders of the representation. While the user 106 stays at the same location but pans his mobile device (camera view) 104, the mobile device 104 may, advantageously substantially in real-time, update the superimposed virtual view to follow the changed camera view.

Figure 2:
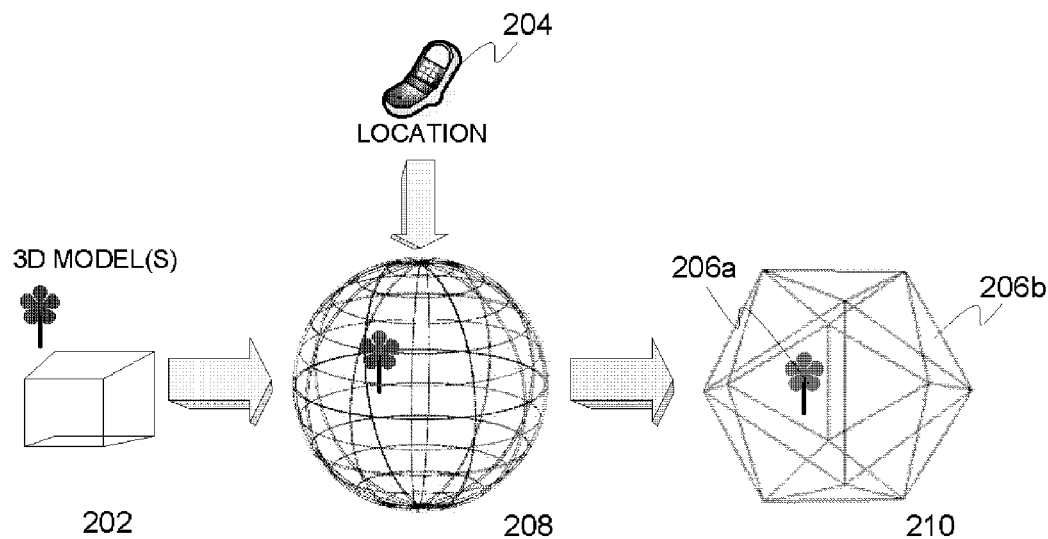
FIG. 2 illustrates an embodiment of the creation of the representation relative to a certain location.

FIG. 2 illustrates the construction of representations in accordance with a certain embodiment. One or more 3D models 202 may be created and stored with linkage to real world location(s). A single model may describe the whole virtual world incorporating a plurality of various objects and details, or a single model may relate to a single object, or a part thereof, only. Also mixed embodiments are possible (e.g. a system of one or more larger scale models and optionally e.g. a number of single object models, both being position-wise related to real world locations, may be established).

A mobile device 204 may indicate the location thereof by sending a message comprising a sufficient indication like one or more coordinates. On the basis of the indication a (real world) location-linked representation of the virtual world may be constructed e.g. in the form of a spherical projection 208 (surface) around the location spot and/or an approximation thereof such as the aforementioned icosahedron 210 with a plurality of 2D faces 206b each of which may be illustrated by a single image, for example. The more coarse approximation may be determined directly, or on the basis of the original, less coarse, representation, for instance. Modeled virtual elements 206a deemed as visible (in sight) from the location according to predetermined one or more rules inherent to the AR application in question are represented by the representation on an (inner) surface area of the sphere or the icosahedron, having location, position and/or size controlled so as to best match the original 3D model and reference to the real world location and advantageously position therein.

The representation surface(s) such as the 2D images forming the inner faces of e.g. icosahedron may be configured to include transparent areas, i.e. areas not including any virtual elements to be visualized by the AR application. Such areas may be omitted from the augmenting phase or also be ostensibly augmented as completely transparent such that only the virtual elements are to be visibly superimposed on the camera view.

Figure 3:
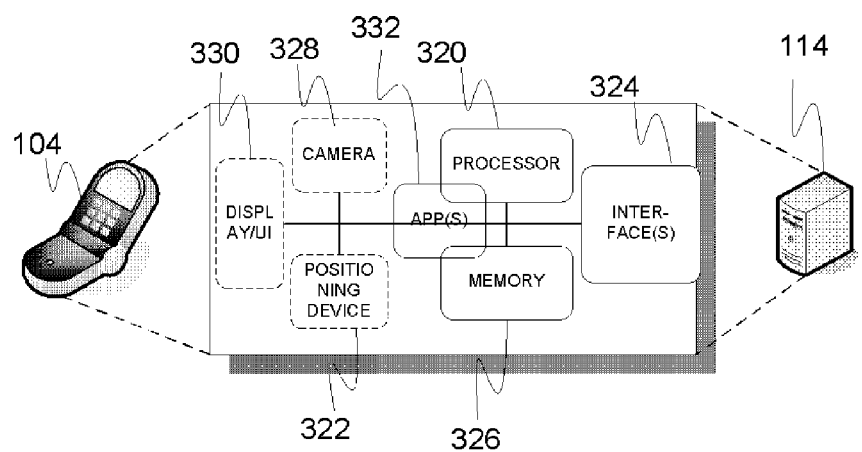
FIG. 3 is a block diagram of an embodiment of a mobile device or a server arrangement in accordance with the present invention.

FIG. 3 illustrates the internals of an embodiment of an entity such as the mobile device 104 or the server arrangement 114 in accordance with the present invention. The entity in question is typically provided with one or more processing devices capable of processing instructions and other data, such as one or more microprocessors, microcontrollers, DSPs (digital signal processor), programmable logic chips, etc. The processing entity 320 may thus, as a functional entity, physically comprise a plurality of mutually co-operating processors and/or a number of sub-processors connected to a central processing unit, for instance. The processing entity 320 may be configured to execute the code stored in a memory 326, which may refer to AR and other applicable software applications 332 in accordance with the present invention. The aforementioned AR entity may indeed be implemented as software stored in the memory entity 326 and executed by the processing entity 320. The AR entity may include a number of applications, modules, and/or other software preferably having at least a functional interconnection. Software 332 may utilize a dedicated or a shared processor for executing the tasks thereof. Similarly, the memory entity 326 may be divided between one or more physical memory chips or other memory elements. The memory 326 may further refer to and include other storage media such as a preferably detachable memory card, a floppy disc, a CD-ROM, or a fixed storage medium such as a hard drive. The memory 326 may be non-volatile, e.g. ROM (Read Only Memory), and/or volatile, e.g. RAM (Random Access Memory), by nature.

A camera 328 comprising e.g. a CCD (charge coupled device) or CMOS (complementary metal oxide semiconductor) sensor is provided as integral or detachable/attachable element. Further sensor entities and e.g. a positioning entity 332 such as a GPS receiver may be likewise provided. They may include (sensor) hardware and/or software elements. For instance, one or more accelerometers, e.g. 2D and/or 3D accelerometers, may be provided as contemplated hereinbefore.

The UI (user interface) 330 may comprise a display, e.g. an (O)LED (Organic LED) or LCD (liquid crystal display) display, and/or a connector to an external display or a data projector, and a keyboard/keypad or other applicable control input means (e.g. touch screen or voice control input, or separate keys/buttons/knobs/switches) configured to provide the user of the entity with practicable data, e.g. camera view and AR, visualization and/or device control means. The UI 330 may further include one or more loudspeakers and associated circuitry such as D/A (digital-to-analogue) converter(s) for sound output, and a microphone with A/D converter for sound input. In addition, the entity may comprise an interface 324 such as at least one transceiver incorporating e.g. a radio part including a wireless transceiver, such as WLAN, Bluetooth or a cellular like GSM/UMTS transceiver, for general communications with external devices and/or a network infrastructure, and/or other wireless or wired data connectivity means such as one or more wired interfaces (e.g. Firewire, LAN such as Ethernet, or USB (Universal Serial Bus)) for communication with other devices such as terminal devices, control devices, peripheral devices such as external sensors, or network infrastructure(s).

It is clear to a skilled person that the entity may comprise few or numerous additional functional and/or structural elements for providing beneficial communication, processing or other features, whereupon this disclosure is not to be construed as limiting the presence of the additional elements in any manner.

A carrier medium such as an optical disk, a floppy disk, a memory card, a hard disk, a memory chip, or a memory stick may be configured to comprise computer code, e.g. a computer program product, for performing at least part of the tasks described herein for carrying out AR. The program code and/or related data such as model or representation data may be provided on a signal carrier. The code and/or the data may be at least partially encrypted using a selected encryption method such as AES (Advanced Encryption Standard).

In some embodiments the entity, such as the mobile device 104 or the server 114 may be self-contained and include all the necessary functionality from obtaining the 3D models, camera view data and location data to producing AR views. Alternatively, tasks may be shared and distributed among available devices 104, 114, and/or optionally further devices embodiment-specifically as understood by a skilled person. The server arrangement 114 may in practice contain a single (computer) device or a plurality of at least functionally interconnected devices fulfilling the required functions as an aggregate server entity.

Figure 4:
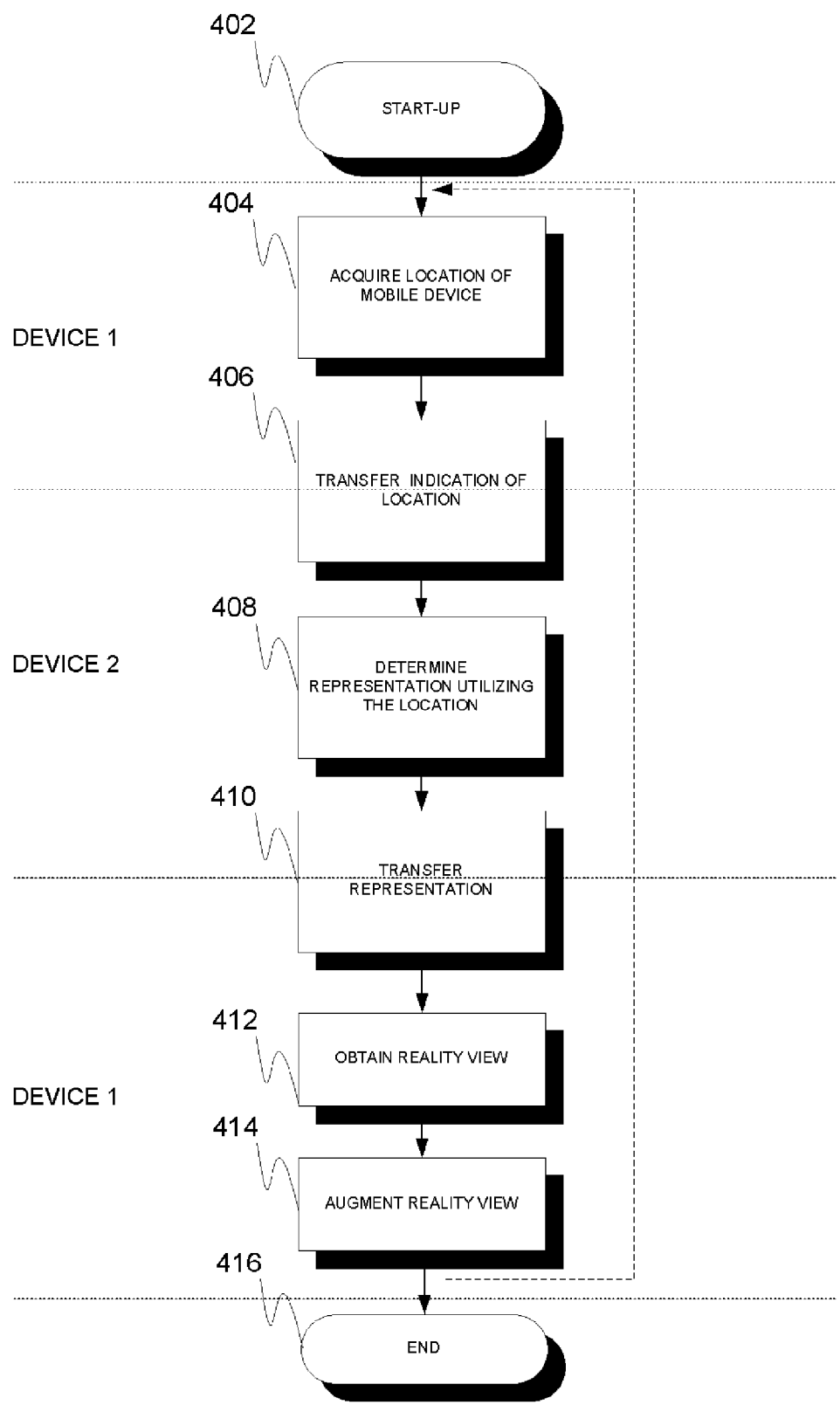
FIG. 4 is a flow chart disclosing an embodiment of a method in accordance with the present invention.

FIG. 4 discloses, by way of example only, a method flow diagram in accordance with an embodiment of the present invention. The horizontal dotted lines represent one option for potentially sharing the execution steps 402-416 between different entities such as the mobile device and the server. For example, general steps 402 and 416 may be, in some form, executed by all active entities, whereas according to one embodiment, steps 404, 412 and 414 are substantially executed by the mobile device, step 408 by the server, and steps 406, 410 are shared incorporating transmitting data from the standpoint of a first entity and receipt thereof from the standpoint of the other. In alternative embodiments, even more than two entities may be utilized for executing the steps. One additional entity could be utilized for location determination, for example. In further embodiments, a single entity such as a mobile device could substantially execute all the steps and be thereby self-supporting even though in many cases clever task sharing may give better overall results in terms of available processing power, memory capacity and power supply.

At 402 an entity or entities, such as a mobile device and a server arrangement in accordance with the present invention are obtained and configured, for example, via installation and execution of related software and hardware for executing the remaining method phases.

At 404 the location of the mobile device is acquired using a suitable positioning technique such as (GPS) satellite positioning and/or network-based positioning. The step may be at least partially executed by a mobile device itself or an external entity such as a network element, or even the server, depending on the applied positioning technique.

At 406 an indication of the location such as coordinates is provided to the entity utilizing such information for determining the representation for use with AR image synthesis.

In one implementation the mobile device transmits the indication to the receiving server for that purpose.

At 408 the representation preferably utilizing the spherical projection or an approximation thereof is generated by the server, for example.

At 410 the representation is provided to the mobile device, i.e. transmitted by the server and received by the mobile device according to one embodiment.

At 412 a real world, preferably real-time, view such as a digital (video) camera view (image) is obtained.

At 414 the representation is utilized for augmenting the real world view, e.g. the camera view, by the virtual elements of the representation. If a virtual element is deemed as observable in a certain direction from the location of the mobile device, it is advantageously correspondingly indicated and visualized by the representation.

Method execution is ended at 416. The broken feedback arrow on the right depicts the potentially substantially continuous nature of method execution. The mutual ordering and overall presence of the method steps, as already deliberated above, may be altered by a skilled person based on the requirements set by each particular use scenario.

Consequently, a skilled person may on the basis of this disclosure and general knowledge apply the provided teachings in order to implement the scope of the present invention as defined by the appended claims in each particular use case with necessary modifications, deletions, and additions. Augmented virtual elements may be visualized based on spherical projection, or an approximation thereof, of the associated virtual model(s) around a view point. By knowing the view direction (aiming direction of the camera), proper corresponding part of the projection may be visualized as superimposed on the camera view. Transparency, i.e. portions defined as visually transparent, may be exploited in the projection (approximate) for differentiating the areas wherein original camera image shall be visible in the augmented image. The required actions for achieving this goal may be distributed among a plurality of devices such as a mobile device and a server. The present invention is suitable for outdoor AR scenarios, such as building-, quarter- and city-related scenarios, and indoor AR scenarios, e.g. factory hall-, mall- and station-related scenarios, both alike. It may be utilized in connection with AR-oriented applications (e.g. browsers) such as Google Goggles™ or LayAR™. The suggested representation technology is applicable for augmenting both real-time (video) camera data and still images.

The invention claimed is:

1. A mobile device comprising
a communications interface for transferring data,
a digital camera for obtaining a camera view of the surroundings of the mobile device at a real world location,
a display for visualizing data such as the camera view, and
an augmented reality (AR) entity configured to
transmit, via the communications interface, an indication of said real world location of the mobile device to an external entity,
receive, by applying data transfer from said external entity via the communications interface, a representation of one or more virtual elements augmented within said camera view, each said virtual element defined by three dimensional (3D) model which is associated with a location within said camera view, each of said one or more virtual elements including a location relative to said real world location of said mobile device, said representation including at least an approximation of a spherical projection, said approximation of said spherical projection defining a virtual environment comprising an associated spherical surface of said spherical projection, which is configured to surround at least said real world location of said mobile device and at least one of said 3D models at an orientation with respect to an orientation of said mobile device corresponding to said real world location of the mobile device, and,
produce an AR view for visualization on said display on the basis of said camera view, such that said at least one of said 3D models of the representation, presents in two dimensions on said display.

2. The mobile device of claim 1, wherein said representation comprises a plurality of 2D images.

3. The mobile device of claim 1, wherein the representation includes polyhedrons, wherein each face of each polyhedron is associated with at least one image.

4. The mobile device of claim 1, wherein the spherical surface is mapped with a texture.

5. The mobile device of claim 1, comprising a satellite receiver, including a GPS (Global Positioning System) receiver, for determining the location.

6. The mobile device of claim 1, comprising an entity for network-based or assisted location determination.

7. The mobile device of claim 1, configured to utilize user input for location and/or orientation determination.

8. The mobile device of claim 1, comprising a position sensor for determining the orientation of the mobile device and/or the camera thereof.

9. The mobile device of claim 1, comprising a position sensor for determining the orientation of the mobile device or the camera thereof, wherein the position sensor comprises an element selected from the group consisting of: an inclinometer, an accelerometer, and a gyroscope.

10. The mobile device of claim 1, configured to utilize camera image data for determining the orientation of the mobile device and/or camera thereof.

11. The mobile device of claim 1, being further configured to obtain a representation relative to an estimated future location thereof and utilize the representation upon arrival at the future location.

12. A system comprising a mobile device comprising
a communications interface for transferring data,
a digital camera for obtaining a camera view of the surroundings of the mobile device at a real world location,
a display for visualizing data such as the camera view, and
an augmented reality (AR) entity configured to
transmit, via the communications interface, an indication of the said real world location of the mobile device to an external entity,
receive, by applying data transfer from said external entity via the communications interface, a representation of one or more virtual elements augmented within said camera view, each said virtual element defined by at least one three dimensional (3D) model which is associated with a location within said camera view, each of said one or more virtual elements including a location relative to said real world location of said mobile device, said representation including at least an approximation of a spherical projection, the approximation of the spherical projection defining a virtual environment comprising an associated spherical surface of said spherical projection, which is configured to surround at least said real world location of said mobile device and at least one of said 3D models at an orientation with respect to an orientation of said mobile device corresponding to said real world location of the mobile device, and, produce an AR view for visualization on said display on the basis of said camera view, such that said at least one of said 3D models of the representation, presents in two dimensions on said display;

said system further comprising a server arrangement comprising:

a data interface for communicating with external entities such as a network infrastructure and a mobile device connected thereto, a model repository for maintaining a number of 3D models of one or more virtual elements and their locations relative to said real world locations, and, a constructor entity configured to determine, on the basis of an indication of a real world location of a mobile device obtained via the data interface and on the basis of a number of 3D models of one or more virtual elements including a location relative to said real world location of the mobile device, a said representation including at least an approximation of a spherical projection, the approximation of the spherical projection configured for surrounding the mobile device at the real world location of the mobile device, and to transmit the representation via the data interface to the mobile device to facilitate producing an AR (augmented reality) view on the display of the mobile device.

13. A method for creating augmented reality (AR) view comprising:

providing an indication of a real world location of a mobile device, obtaining a representation, comprising a plurality of two dimensional (2D) images, determined based on a plurality of three dimensional (3D) models of virtual elements including a location relative to the real world location of the mobile device, said representation including at least an approximation of a spherical projection, the approximation of the spherical projection defining a virtual environment comprising an associated spherical surface of said spherical projection, which is configured to surround at least the real world location of the mobile device and at least one of the 3D models at an orientation with respect to an orientation of said mobile device corresponding to said real world location of the mobile device, and, obtaining a digital camera view by the mobile device at said real world location of the mobile device, and, producing an AR view for visualization on a display on the basis of the camera view and an orientation-wise matching portion of the representation.

14. A method for providing data for augmented reality (AR) application, comprising obtaining an indication of the real world location of a mobile device, constructing a representation, comprising a plurality of two dimensional (2D) images, determined based on a plurality of three dimensional (3D) models of virtual elements including a location relative to the real world location of the mobile device, said representation including at least an approximation of a spherical projection, the approximation of the spherical projection defining a virtual environment comprising an associated spherical surface of said spherical projection, which is configured to surround at least the real world location of the mobile device and at least one of the 3D models at an orientation with respect to an orientation of said mobile device corresponding to said real world location of the mobile device, and, transmitting the representation to the mobile device to facilitate it producing an AR view.

15. A method for augmenting reality, comprising obtaining an indication of the real world location of a mobile device, constructing a representation, comprising a plurality of two dimensional (2D) images, determined based on a plurality of three dimensional (3D) models of virtual elements including a location relative to the real world location of the mobile device, said representation including at least an approximation of a spherical projection, the approximation of the spherical projection defining a virtual environment comprising an associated spherical surface of said spherical projection, which is configured to surround at least the real world location of the mobile device and at least one of the 3D models at an orientation with respect to an orientation of said mobile device corresponding to said real world location of the mobile device, and, producing an AR (augmented reality) view for visualization on a display on the basis of the camera view and an orientation-wise matching portion of the representation.

\* \* \* \* \*